United States Patent [19]

Hamilton

[11] 3,724,542
[45] Apr. 3, 1973

[54] METHOD OF DISPOSAL OF WASTE ACTIVATED SLUDGE

[75] Inventor: Charles E. Hamilton, Midland, Mich.

[73] Assignee: The Dow Chemical Company, Midland, Mich.

[22] Filed: Mar. 1, 1971

[21] Appl. No.: 119,927

[52] U.S. Cl................166/246, 166/308, 166/305 D
[51] Int. Cl...................E21b 43/22, E21b 43/26
[58] Field of Search.......166/246, 305 D, 308; 210/7, 210/95; 195/3

[56] References Cited

UNITED STATES PATENTS

| | | | |
|---|---|---|---|
| 3,185,216 | 5/1965 | Hitzman | 166/246 |
| 3,335,798 | 8/1967 | Querio et al | 166/246 |
| 2,413,278 | 12/1946 | Zobell | 166/246 UX |
| 2,660,550 | 11/1953 | Updegraff et al | 166/246 UX |
| 2,975,835 | 3/1961 | Bond | 166/246 |
| 3,032,472 | 5/1962 | Hitzman | 166/246 |
| 3,105,014 | 9/1963 | Harrison | 166/246 X |
| 3,340,930 | 9/1967 | Hitzman | 166/275 X |

*Primary Examiner*—Stephen J. Novosad
*Attorney*—Griswold & Burdick and Richard W. Hummer

[57] ABSTRACT

Activated sludge from waste disposal operations has been found to grow utilizing hydrocarbons from petroleum or oil shale in an anaerobic environment and producing gas containing an unexpected preponderance of hydrocarbons, particularly methane. The invention provides a method for disposing of waste activated sludge with the concurrent production of useful fuel.

5 Claims, No Drawings

METHOD OF DISPOSAL OF WASTE ACTIVATED SLUDGE

BACKGROUND OF THE INVENTION

In modern efforts to reduce pollution of the environment, various waste treatment systems have been employed. One system which has enjoyed increasing attention employs biological oxidation to consume organic contaminants in waste water. In such operations a population of microorganisms, generally called activated sludge, is selected or adapted to consume the organic contaminants while the microorganisms are actively growing in the presence of an abundant supply of oxygen or air. However, such activated sludge processes continually produce large quantities of waste bacterial sludge which is difficult to dewater and which must itself be disposed of. Recently it has been shown in U.S. Pat. No. 3,335,798 that under certain conditions activated sludge disposal may be accomplished by pumping the sludge into suitable porous subterranean formations.

There have been numerous suggestions for improving production of petroleum by injecting selected bacteria or other microorganisms into petroleum bearing formations. In general, as in U.S. Pats. Nos. 3,185,216 and 3,340,930 such operations have involved the use of bacteria or other microorganisms, usually anaerobic in nature, specially selected or adapted to utilize petroleum hydrocarbons as a carbon source. Recently in U.S. Pat. No. 3,332,487 the use of aerobic bacteria in oil recovery has been suggested, however, in this case air or oxygen must be injected into the oil bearing formation in order to promote the growth of these aerobic bacteria. Such teachings are in keeping with prior knowledge since one would not expect aerobic bacteria to survive and metabolize in an anaerobic environment such as is found in most subterranean formations.

SUMMARY OF THE INVENTION

In accordance with the present invention it has now been discovered that fresh activated sludge organisms can utilize hydrocarbons as a food source under substantially anaerobic conditions with the production of gases consisting of substantial quantities of methane and having appreciable utility as fuel gas. Thus, the present invention provides a method for disposing of excess activated sewage sludge with a minimum of contamination of potable water sources and under aesthetically pleasing conditions while providing fuel gas for future use. Surprisingly, in a preferred embodiment of the invention it has been found that activated sewage sludge can utilize the kerogen of oil shale as a carbon source for its growth. Oil shales constitute a tremendous reserve of hydrocarbons in the United States which have so far found little or no economic use.

As employed in the present specification and claims, the term "activated sludge" means an aqueous suspension of microorganisms produced under highly aerobic conditions in the secondary treatment of wastes such as sewage. Methods and apparatus for propagating, handling and separating such activated sludge are shown in numerous publications and patents, as, for example, in U.S. Pat. No. Re. 15,140, and in U.S. Pat. Nos. 1,247,542 and 1,717,780.

In carrying out the present invention, it is convenient to employ existing deep wells penetrating hydrocarbon-bearing formations such as oil shales or worked out petroleum fields. Alternatively, new wells may be drilled into the hydrocarbon-containing formation. In case oil shale is the type of formation employed, as in the preferred embodiment of the present invention, it will generally be necessary to fracture the shale by known methods since such shale is generally of relatively low permeability. If fracturing is employed it would usually be advantageous to use a propping agent such as sand to hold open the fissures formed in the fracturing operation. In any case, it is desirable to cement the casing of the well in proper fashion to prevent the sewage sludge from entering into aquifers whereby it might be transported into potable water supplies.

The activated sludge is introduced into the formation through the well bore in any suitable fashion. In some cases the height of sludge in the well piping will be sufficient to create pressure and force the sludge into the formation. Otherwise, it may be necessary to employ positive displacement pumps to accomplish the injection of the sludge. In general, the sludge will be partly dewatered before injection using a flotation or sedimentation operation as is common in sewage treatment practice. However, it is undesirable to have the sludge held for such a length of time before injection that the sludge becomes septic.

In most natural formations containing hydrocarbons, sufficient auxiliary nutrients will be present to support the growth and metabolism of the injected bacteria. However, it will sometimes be found beneficial to add a nitrogen source such as ammonia or nitrate and/or a phosphorus source such as a phosphate to obtain optimal growth of the sludge organisms. In practice a formation is chosen wherein any connate water is not in the form of a concentrated brine since the latter inhibits the growth of activated sludge organisms. These organisms can tolerate up to about 15 percent by weight of dissolved salts in the water, however, it is preferred to operate in formations wherein the water contains not more than about 5 percent by weight of dissolved salts. It is also desirable to choose a formation which does not contain appreciable quantities of sulfide minerals or of sulfate reducing bacteria which produce large quantities of hydrogen sulfide since as little as 500 parts per million by weight of hydrogen sulfide is toxic or lethal to activated sludge organisms. It is further critical for obtaining the desired growth of the organisms to maintain the pH of the injected material in the range of 6.5 to about 8.5. The sludge may be injected into the formation at pressures of up to at least about 2,500 lbs. per square inch and in formations having ambient temperatures of from about 10°C. to about 70°C., preferably from about 30°C. to 50°C.

The following examples illustrate the invention but are not to be construed as limiting the same.

EXAMPLE 1

Five Grams of Antrim oil shale from Michigan (containing about 5.75 percent by weight of combustible carbon) was finely powdered and placed in a 1 liter bottle and covered with about 1 liter of distilled water. The resulting mixture was inoculated with 1 gram of activated sludge from a waste disposal plant which continually treated a mixture of about 5 percent sanitary swage and 95 percent waste from industrial organic chemical manufacture. The bottle was then sealed with a stopper bearing a curved tubing connector to a water-trapped gas collection vessel. The vessel and contents were maintained at room temperature of about 25°C. and observed for gas production. In the first 5 days gas was produced only at the rate of 0.4 cc. per day. Thereafter, the gas production rose steadily until at the twelfth day gas was produced at the rate of 8 cc. per day. After 21 days a sample of the gas was taken for analysis by gas chromatography. This initial sample showed a ratio of methane to carbon dioxide in the sample of 37:1 by volume. After an additional 37 days of incubation, gas was still being produced at the rate of about 7 cc. per day and analysis by gas chromatography showed a composition as follows:

| Component | Percent by Volume |
|---|---|
| Carbon dioxide | 1.5 |
| Methane | 88.8 |
| Air | 9.7 |

The air had been inadvertently introduced in transferring the gas from the collector to the sample bottle. Gas production was still in progress after an additional 12 days after the foregoing at the time that this determination was terminated.

For comparison, a control determination was run exactly as in the foregoing except that no oil shale was placed in the bottle. The activated sludge digested itself slowly producing less than 0.5 milliliter of gas per day over a period of 70 days. The gas produced was analyzed by gas chromatography and found to contain 54.4 percent by volume of carbon dioxide and only 43.6 percent by volume of methane.

EXAMPLE 2

The procedure of Example 1 was repeated except that several pieces of the shale were employed rather than a finely powdered shale used in Example 1. The shale weighed 53 grams and had a surface area estimated as about 20 square inches. The inoculum consisted of 100 milliliters of the waste activated sludge containing about 3.5 grams of sludge solids. After 52 days of digestion, gas as being produced at the rate of about 17 ml. per day. A sample of the gas at this time was found to contain 81.6 percent methane and 3.8 percent carbon dioxide by volume. After the digestion had proceeded for 79 days, the shale was examined and it was found that the bacteria had propagated along the cleavage planes of the shale apparently following the deposits of hydrocarbon therein.

EXAMPLE 3

Employing the same apparatus and following the general procedure of Example 1, 50 grams of powdered Antrim shale from a Michigan deposit was digested with 500 ml. of activated sludge (containing 3.8 percent by weight of solids) and sufficient distilled water to fill the 1 liter bottle. The sludge employed in this determination was from a waste disposal plant which had been treating phenolic wastes from chemical manufacture. It was observed that there was little gas production during the first month of digestion at room temperature but thereafter gas production rose during the following month to a level of about 20 milliliters per day. A sample of the gas at the end of 2 months was analyzed by gas chromatography and found to contain 78.8 percent of methane and 4.41 percent of carbon dioxide by volume.

A comparison determination carried out in exactly the same fashion employing the same volume of the activated sludge without the addition of the oil shale produced a total of only 4 milliliters of gas during the first 2 months of digestion.

EXAMPLE 4

When the procedure of Example 1 was repeated employing an anaerobically digested sludge from a septic tank or a sludge from a grease trap on a sanitary sewer instead of the activated sludge of Example 1, little or no gas production was obtained. In contrast when the procedure was repeated employing waste activated sludge from the sewage treatment plant of a small midwestern city, good gas production was obtained and the gas contained a high proportion of methane.

EXAMPLE 5

Employing the apparatus of Example 1, 500 ml. of crude petroleum identified as South Buckeye Crude was confined with a mixture of 150 ml. of oil-field brine and 350 ml. of an activated sludge from the same source as that employed in Example 2 and containing 2.75 percent by weight of sludge solids. Digestion was carried out at a temperature of about 40°C. Substantial gas evolution occurred and a sample of the gas taken 90 days after initiation of the digestion was found to contain 46.8 percent by volume of methane and about 16 percent by volume of other volatile hydrocarbons with only 5.2 percent by volume of carbon dioxide.

EXAMPLE 6

From drilling logs it is ascertained that the well bore of an abandoned oil exploration well traverses a substantial stratum of oil shale. The well is sealed off at the base of the shale stratum and the casing is perforated at several levels in said stratum to provide communication with the shale. The shale is then fractured by injecting an aqueous slurry of sand into the well under high pressure. The well bore is then cleaned and waste activated sludge from a municipal sewage disposal plant is pumped into the well. After the initial fill-up period, the sludge is injected into the well at a pressure of 200 p.s.i. at the well-head. After continuing injection for two years the well is closed in until tests show that evolved gas has filled the well bore. The gas is then valved off for use as fuel.

I claim:

1. A method which comprises collecting activated sludge from a waste disposal operation, injecting said sludge through a well bore into a subterranean hydrocarbon-containing formation and maintaining the sludge in said hydrocarbon-containing formation at a pH of from about 6.5 to about 8.5 for a period of time to produce a fuel gas containing a preponderance of methane.

2. A method according to claim 1 wherein the subterranean hydrocarbon-containing formation is an oil shale.

3. A method according to claim 2 wherein the oil shale is fractured prior to the injection of the activated sludge.

4. A method according to claim 2 wherein the sludge is maintained in contact with the oil shale under anaerobic conditions.

5. A method according to claim 1 wherein the ambient temperature in the subterranean formation is from about 10°C. to about 70°C.

* * * * *